April 30, 1929.  H. A. DELANO  1,710,723
WELDING CURRENT CONTROL CIRCUIT
Original Filed Jan. 10, 1927
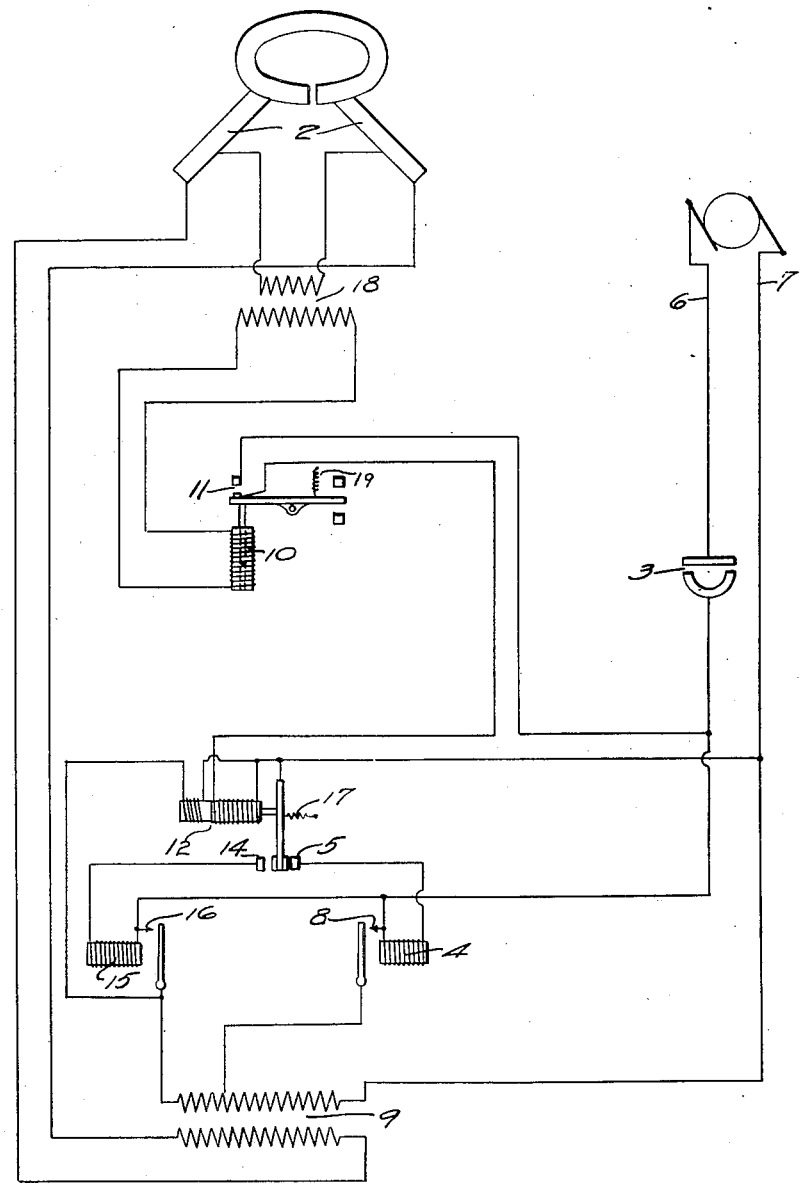
INVENTOR
Howard A. Delano.
BY
ATTORNEY Patented Apr. 30, 1929.

1,710,723

UNITED STATES PATENT OFFICE.

HOWARD A. DELANO, OF YORK, PENNSYLVANIA, ASSIGNOR TO AMERICAN CHAIN COMPANY, INC., A CORPORATION OF NEW YORK.

WELDING-CURRENT-CONTROL CIRCUIT.

Application filed January 10, 1927, Serial No. 160,071. Renewed March 21, 1928.

This invention is to provide means for improving the regulation of the voltage used in an electric resistance welding system.

It has heretofore been the practice to use a predetermined voltage to attain a certain temperature and trust to the experience of the welder to determine the correct point at which to regulate the current, thereby preventing the burning of the welded parts.

This invention is intended to control the regulation of the voltage supplied to the electrodes of the welding machine and thereby give the welder a more even and easier handled temperature.

A clear conception of the objects and operation of the invention may be had from the following description in conjunction with the drawing which shows the system in schematic form.

When the object to be welded is placed in position between the electrodes 2 and the circuit breaker 3 is closed, a circuit will be closed from supply lead 7, armature and contact 5 of relay 12, said contact being held closed normally by means of spring 17, winding of relay 4 circuit breaker 3 to supply lead 6. Relay 4 operates in this circuit and closes its armature and contact 8, thereby completing the circuit from supply lead 6 circuit breaker 3 through a portion of the primary winding of transformer 9 to supply lead 7.

The current is now induced to the secondary winding of transformer 9 and thence to the electrodes 2. As the temperature of the work between electrodes 2 increases the resistance increases, thereby causing the voltage to rise. This increase in voltage is induced through transformer 18 to the winding of voltage meter relay 10 which is adjusted to operate at a certain predetermined voltage. When relay 10 operates it closes contact 11 which completes the circuit for relay 12 traced from the supply leads 6 and 7 through circuit breaker 3. The operation of relay 12 opens contact 5 and closes contact 14 thereby releasing relay 4 and operating relay 15. Relay 15 operated closes contact 16 which connects all of the primary winding of transformer 9 in circuit with the supply leads 6 and 7 thereby reducing the voltage at the electrodes and allowing time for the welder to catch the weld and trip the circuit breaker 3 at the proper temperature. Contact 16 also closes a holding circuit for relay 12 from supply leads 6 and 7 through the secondary winding of relay 12. This holds relay 12 operated during the time that relay 4 is releasing and relay 15 is operating. At that time there is no current passing through the primary winding of transformer 9 and therefore the voltage supplied to relay 10 is lowered, allowing it to release. The release of relay 10 would cause the release of relay 12 unless it is held operative by the above traced circuit.

When the circuit breaker 3 is tripped the circuit through the windings of relays 12 and 15 are open allowing contact 5 to again close and contact 16 to open. With contact 5 closed the circuit for relay 4 is again ready, against the time when the circuit breaker 3 is closed at which time the cycle will be repeated.

Claims:

1. In a resistance welding circuit, a pair of electrodes, a welding transformer, said electrodes being connected across the secondary winding of said transformer, a tap on the primary winding of said transformer for rendering part of said winding ineffective, said primary winding and tap being connected to a source of current through the contacts of a pair of alternately operated relays, and means for operating one of said relays to connect the full primary winding to said source when the resistance across said electrodes reaches a predetermined limit.

2. In a resistance welding circuit, a pair of electrodes, a welding transformer, said electrodes being connected across the secondary winding of said transformer, a tap on the primary winding of said transformer for rendering part of said winding ineffective, said primary winding and tap being connected to a source of current through the contacts of a pair of alternately operated relays, and a voltmeter relay for operating one of said relays and release the other to connect the full primary winding to said source when the resistance across said electrodes reaches a predetermined limit.

3. In a resistance welding circuit, a pair of electrodes, a welding transformer, said electrodes being connected across the secondary winding of said transformer, a tap on the primary winding of said transformer for rendering part of said winding ineffective, said primary winding and tap being connected to a source of current through the contacts of a pair of alternately operated relays, a voltmeter relay actuated when the resistance across said electrodes reaches a predetermined limit, said voltmeter relay operating one of said relays and releasing the other thereby connecting the full primary winding to said source and lowering the voltage across said electrodes to slow up the welding action.

In testimony whereof, I have signed this specification.

HOWARD A. DELANO.